(12) United States Patent
Bissantz

(10) Patent No.: US 8,122,369 B2
(45) Date of Patent: Feb. 21, 2012

(54) SYSTEM FOR PROVIDING INFORMATION TO A USER

(76) Inventor: Nicolas Bissantz, Nuremberg (DE)

( * ) Notice: Subject to any disclaimer, the term of this patent is extended or adjusted under 35 U.S.C. 154(b) by 156 days.

(21) Appl. No.: 11/387,359

(22) Filed: Mar. 23, 2006

(65) Prior Publication Data

US 2007/0240066 A1 Oct. 11, 2007

(51) Int. Cl.
*G06F 3/048* (2006.01)
(52) U.S. Cl. ...................................................... 715/774
(58) Field of Classification Search .................. 705/37;
715/774, 785, 218, 244, 245, 705, 710, 711,
715/763, 788, 800, 808, 809, 810, 812, 815,
715/835, 836, 837, 838, 841, 843, 846, 849,
715/850, 859, 861, 866
See application file for complete search history.

(56) References Cited

U.S. PATENT DOCUMENTS

| 5,276,679 | A * | 1/1994 | McKay et al. ................ | 370/358 |
| 6,182,098 | B1 * | 1/2001 | Selker ........................... | 715/202 |
| 7,035,170 | B2 * | 4/2006 | Narayanaswami et al. ... | 368/223 |
| 7,068,288 | B1 * | 6/2006 | Good et al. ................... | 345/619 |
| 2002/0049713 | A1 * | 4/2002 | Khemlani et al. ............. | 707/1 |
| 2002/0059594 | A1 * | 5/2002 | Rasmussen et al. ........... | 725/37 |
| 2004/0239683 | A1 * | 12/2004 | Chu et al. ..................... | 345/619 |
| 2007/0203816 | A1 * | 8/2007 | Costache et al. .............. | 705/35 |

OTHER PUBLICATIONS

Byers, What Are Sparklines, Nov. 6, 2004, http://web.archive.org/web/20050507041149/http:/sparkline.org/.*
Tufte, Sparklines: theory and practice, May 27, 2004, http://www.edwardtufte.com/bboard/q-and-a-fetch-msg?msg_id=0001OR&topic_id=1.*
Gregorio, Sparklines in data: URIs in Python, 4/45/2005, http://bitworking.org/news/Sparklines_in_data_URIs_in_Python.*
Gregorio, Sparkline Generator, http://bitworking.org/projects/sparklines/.*
Byers, Sparkline PHP Graphing Library, Nov. 6, 2004, http://bitworking.org/projects/sparklines/.*

* cited by examiner

*Primary Examiner* — Weilun Lo
*Assistant Examiner* — Enrique Iturralde
(74) *Attorney, Agent, or Firm* — Dilworth & Barrese, LLP.

(57) ABSTRACT

The present invention is directed to a system for providing information to a user comprising: a screen for showing the information to the user, wherein the screen is the screen of a portable device or of a personal computer, receiving means for receiving one or more values from a source of values on which values the information shown to the user is based, generating means for generating two or more data lines wherein each of said data lines comprises at least one data set, wherein the data sets comprise data which are based on said values and wherein the data sets are assigned to the at least two data lines by predetermined or changeable criteria and displaying means for simultaneously showing said two or more data lines to the user on said screen.

28 Claims, 2 Drawing Sheets

Fig. 1

| | | |
|---|---|---|
| Dagobert tual (Umsatz) ▬▬▬_▬▬▬ | 419' [199' [1,93'] kum. (Umsatz) _ _ _ ▬▬▬▬ _ 419' [4 | ▲ ≡ |
| oCalls 2    3. Einrichter 2    4. gühring 2    5. Labor 28 2    6. MIS Austria 2    7. Oracle D GmbH | | » ≡ |
| DMails 2. MIS AG 2    3. Klinikum Fichtelgebirge 2    4. Altanapharma 2    5. Bayer HealthCare 2    6. UB5 F | | » ≡ |
| iCalls 28 2    3. VEGA Grieshaber KG 2    4. Wöhrl 1    5. Schwäbisch Hall 1    6. LUTUM + TAPPERT DV-BEI | | » ≡ |
| IMails 3    3. Von Roll Isola Holding Ltd. 2    4. Düwi 2    5. Burgmann 2    6. MIS Austria 2    7. LUTUM + TA | | » ≡ |
| oVisits.    2. debitel 1 | | » ≡ |
| IVisits 2. MIS AG 1 | | » ≡ |
| iLtrs omains 1    2. Wöhrl 1    3. Zunke Jörg 1 | | » ≡ |
| OfrsIOrds 1 | | » ≡ |
| Invcs äbisch Hall 1    3. Düwi 1    4. UB5 Real Estate Kapitalanlagegesellschaft mbH 1 | | » ≡ |
| Dwnlds .SparkFont 37    3. SparkTicker 17    4. Klinikum Fichtelgebirge 12    5. SparkTicker Requests 4    6. | | » ≡ |
| All actvs (CA) 3    Konditionen (CA) 2    Leistung (CA) 1    LSupport (CA) 1    Meeting (CA) 1    Netmeeting (C | | » ≡ |
| Web 30d▬▬▬▬▬▬▬▬▬▬ 254 [206 [414] DeltaMaster (Page Impression) ▬▬_▬_▬ | | ▬▬▬ ≡ |
| Spl dwnlds rvices Inc. 3    2. Road Runner 13241 2    3. CARNIVAL CRUISE LINES 3655 N.W. 1 | | » ≡ |

SYSTEM FOR PROVIDING INFORMATION TO A USER

BACKGROUND OF THE INVENTION

The present invention refers to a system for providing information to a user.

In order to display a large amount of information in a compact and intelligible form it is known from the prior art to use so-called sparklines which are word-sized, minimized diagrams. Sparklines provide dense information in small spaces and do not necessitate a complex and time-consuming loading of databases and calculation of reports by the user. For example exchange rate movements, sports results, temperature variations etc. may easily be illustrated by use of such word-sized graphics.

It is also known to provide a single data line comprising a plurality of sparklines which is moving over the screen of a computer. Such data lines increase the amount of displayed information and the movement of the sparklines allows providing the user with a lot of current information without user-interaction. The displayed information may be updated so as to provide the user permanently with current information. Such data ticker based on sparklines help recognizing problems or developments easily and quickly so that suitable action can be taken for example by a financial analyst or controller in due course if necessary.

SUMMARY OF THE INVENTION

It is the object of the present invention to improve the known system for providing information to a user such as a financial analyst or a controller.

This object is solved by a system with the features herein. The system according to the present invention comprises a screen for showing the information to the user and receiving means for receiving one or more values from a source of values on which the information shown to the user is based. The screen is the screen of a portable device, such as a cell phone or laptop or of a personal computer. Said values are for example results of sporting events, business data, such as turnover values, sales values, stock prices, economic values such as unemployment data etc. The system further comprises generating means for generating two or more data lines wherein each of said data lines comprises at least one data set, wherein the data sets comprise data which are based on said values. In accordance with the invention the data sets are assigned to one or more of the at least two data lines by predetermined or changeable criteria. The system according to the invention further comprises displaying means for simultaneously showing said two or more data lines to the user on said screen.

The screen may be a screen of any kind of computer device.

The present invention allows the simultaneous display of two or more and preferably of a plurality of data lines which each are composed of at least one data set. The data sets comprise data which are based on the values from a source of values. The present invention allows to give a perfect overview even of complex processes due to the ability to display at least two data lines which may be sorted by suitable criteria such as for example turnovers, yields, losses, number or kind of orders, calls, mails, history of any process, information about related products, competitors, customers or any other activity for example of different departments or sections of a company. Based on this condensed information it is easily possible for the management, for a controller or for a financial analyst to detect not desired trends and to take action in due course.

Due to the fact that the displaying means are adapted to display two or more than two data lines simultaneously it is not only possible to provide a lot of information to the user but also to easily compare the data lines with each other and also to display the result of such comparison in a further data line. The two or more than two data lines may displayed one below the other, side by side or may have any other desired orientation on the screen.

The information is displayed on a screen of a personal computer or laptop or on a screen of a navigation system or of a handheld portable device, such as a cell phone, PDA etc.

It is of particular advantage if at least one of the data sets forming the data lines comprises sparklines. As mentioned above sparklines are word-sized graphics which display a large amount of information in a small space. The sparklines may contain vertical or horizontal bar diagrams or line diagrams etc. showing for example the development of any desired value over time, i.e. the history of a parameter of interest. The data lines may also comprise other data such as text and a combination of text and values such as for example the number of incoming calls from a particular customer or from several customers.

At least one data line may comprise a label designating the kind of data of which the data line is comprised. Such labels designate the data line and easily show to the user which kind of data are displayed in the data line. Such labels are optional and can be omitted if the nature of the displayed data is self explaining. However, the labels ease the orientation of the user by clearly designating the kind of data of which the data lines are composed.

The values which are the basis of the data may be textual or numerical values. The values may be for example listed in one or more tables or may be included in one or more text documents such as reports.

In accordance with a further aspect of the invention the data may be uploaded to an internet or intranet web server and then integrated into an internet or intranet web page. Alternatively the system is adapted to provide the information to the user independently from the internet or intranet. The system may thus also be a "desktop version" which may be started without interaction with the internet or intranet and which provides the information on the screen of a computer or on the screen of a handheld device such as a PDA. If the device is a portable device it is possible to provide the user of the system at any location with the desired information.

It is of particular advantage if the system comprises moving means for moving at least one of said data lines on the screen. The movement of the data lines allows providing a large amount of information to the user without requiring user interaction. It is possible to adapt the system so that user action is not necessary for providing the information but possible to provide the user with additional information.

In accordance with a further embodiment of the invention it is conceivable that the system comprises moving means for moving only those data lines which are not fitting onto the screen whereas data lines which are fitting onto the screen are not moved. It is of course also possible to move all data lines or to provide a system in accordance to which no data line is moved.

Preferably the labels designating the data lines are not moved on the screen. In accordance with this embodiment of the invention preferably the labels forming the first row or line of the data field are not moved while the data lines themselves may be moved over the screen. Such movement may for example be a horizontal or vertical movement over the screen.

The system may comprise a database in which said values are stored wherein the database is connected or connectable to said receiving means for receiving the values from the database. The database may be part of the system or may be an external datasource, database or webservice to which the receiving means for receiving data may be connected. The database may comprise text files and/or data files.

In accordance with a further embodiment of the invention the system comprises update means which are adapted to trigger an update of the data on a regular basis, on demand by the user or automatically, e.g. if any of said values changes. This allows to provide the user permanently with current data and allows an immediate reaction if a not desired trend or not desired values are detected.

The generating means of the system are adapted to generate the data as text or as graphic, such as a vector-based graphic or as a bitmap.

As outlined above the system may allow the upload of the data by uploading means to an internet web server by FTP, by file copy or by HTTP or SMTP. The web page on which the data lines are displayed may be a XML, HTML web page, a XHTML web page or a web page including a flash or java application.

In accordance with a further embodiment the system comprises selecting means for selecting the data and/or the kind of data and/or the kind of visualization of data, such as color, size and the legend of the data, by the user of the system or by the provider of the system, which data are used for generating the data lines. It is conceivable that only a part of the values which are available are of relevance for the requested information so that the user or the provider of the system can select this part of the values for generating data lines.

It is also possible for the user to select color and/or the size of the displayed data as well as legends representing for example a designation of the displayed data, the figures underlying the displayed data or the kind of the displayed data.

In order to further increase the amount of information shown to the user the system may comprise detail displaying means for showing details referring to the data shown on the screen. These detail displaying means may be adapted to provide size adjustments for depicting more details such as additional labels as well as relative and absolute values or value changes referring to the displayed data.

The detail displaying means may also be adapted to dynamically enlarge the distance between graphical elements of the data set in order to place values or value labels into the generated space. If for example a particular column or bar of a sparkline is of interest it is possible to increase the space on both sides of this column or bar and to provide the user with additional information in this space as for example absolute values or relative values showing the relation of the selected column/bar to the previous or succeeding column/bar etc.

The system further may comprise adjusting means for adjusting the movement, such as direction and/or speed of movement of the data lines on the screen.

Said detail displaying means and/or said adjusting means may be triggered by moving on the screen a pointer to said data or by touching on a touch screen the location on which the data are displayed on the screen.

The screen may be the screen of a portable device or of a personal computer or laptop. The portable device may be a handheld device such as a cell phone or a PDA. As outlined above the screen may be a touch screen which allows easy user interaction.

The information shown on the screen may be displayed in form of a window or frame. This window or frame may be adjusted in size and position so that the work with the computer or device can be continued at the same time as the data lines are shown on the screen. Thus the present invention is a valuable tool in particular for persons who wish to have a full and clear overview over any process of interest, such as controllers, financial analysts, managers etc.

BRIEF DESCRIPTION OF THE DRAWINGS

Further embodiments and advantages of the invention are described by the embodiment which is shown in the figures.

FIGS. 1 and 2 show a snapshot of a computer screen of the system according to the present invention. FIG. 2 shows the invention in form of data lines which are located in a frame or window ("ticker portal") opening on the screen of a computer device.

DESCRIPTION OF THE PREFERRED EMBODIMENTS

Figure 2:
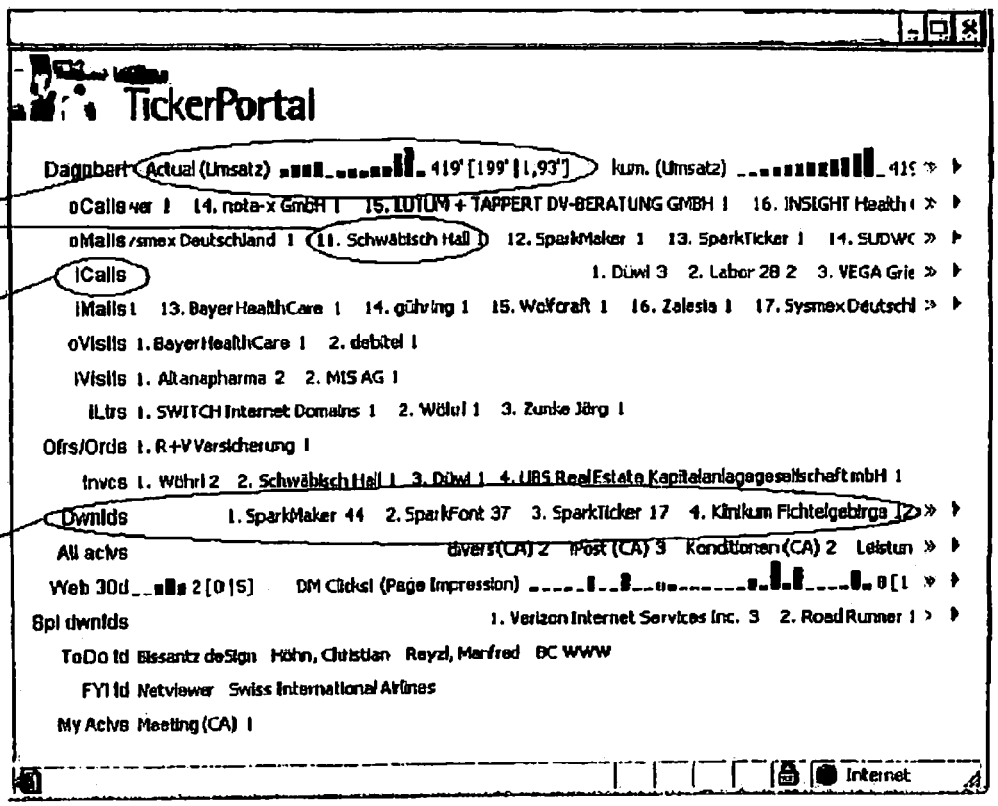

The following explanation of the embodiment applies to both figures.

The system comprises a computer screen of a common personal computer or laptop for showing the information to the user.

The system further comprises a database which stores textual or numerical values. Such textual values are for example the name of the customers, the name of the ordered products etc. Numerical values are for example turnover values vs. time.

The values are stored in a database which is accessed by receiving means of the system of the present invention. The receiving means are adapted to read or receive from the database values which are the basis for generating data lines.

After receipt of the values the receiving means transfers the values to the generating means of the system. The generating means generate data from the values such as sparklines and/or textual information and form data sets 20 comprising said data. One or usually more than one data set 20 is assembled into a data line 10 which comprises one or preferably two or more data sets 20 in a row.

The receiving means further receive labels 30 from the database which labels designate the kind of the data displayed in each of the data lines 10. These labels 30 form the first column or line of the shown data lines 10. The data lines 10 usually move horizontally over the screen. However, the invention covers also any other kind of movement such as a vertical movement of data lines for example at one side of the screen. Contrary to the data lines 10 the labels 30 are preferably not moved by the moving means of the system.

The moving means are adapted to move the data lines 10 on the screen so that the user may be provided with a lot of information without the requiring user interaction.

As outlined above the generating means are provided to generate data lines 10 based on values of a database. As shown in the figures the data lines 10 comprise sparklines which have the shape of vertical bar diagrams, line diagrams etc. reflecting the development of a value over time. The data lines 10 also comprise textual information such as the name of customers or the name of products as shown in the figure. This textual information is linked with numerical values such as the number of calls of the customers or the number of product downloads.

As shown in the figures the system of the present invention allows the representation of a number of data lines 10, each of the data lines 10 reflecting a certain category of the displayed data. In the shown example these categories which are designated by the labels 30 in the first row are turnover, outgoing and incoming calls, mails, visits, orders, downloads etc. Moved data lines 10 are located beside the labels 30 wherein the data lines 10 are composed of data sets 20. The data sets 20 are comprised of data which data reflect values of the labeled category.

As shown in the first line of the enclosed figures the data may comprise sparklines which show the development of the turnover versus time for different companies or departments or sections of a company. Reference numeral 20 in the first line in FIG. 2 depicts a full data set 20 comprising a textual information, namely the turn-over, a graphical information in form of a sparkline and numerical values on which some of the columns of the sparklines are based. The first, second and third number on the right-hand side of the vertical bar diagram of the sparkline reflect the value on which the last column (current value), the smallest column (minimum value) and the largest column (maximum value) of the sparkline is based, respectively. Because the most current value is depicted both numerically and graphically, the eye is capable of safely measuring the magnitude of the unlabeled values.

A label designating the sparkline is located on the left-hand side of the vertical bar diagram of the sparkline. This label, the bar diagram as well as said numbers form a data set 20. Of course other kinds of representation such as line diagrams as well as other values describing the diagram, such as mean values, deviations, absolute and relative values etc. are also conceivable to be displayed.

As shown in the second and third data line 10 of the figures the data lines have not to comprise graphical elements but can also contain textual information. In this example the second line is a data line which shows the number of outgoing calls to different firms. The data line 10 comprises the name of the company, on the right hand side thereof the number of outgoing calls to this company and on the left hand side the ordinal number of the respective company wherein the ordinal number is based on the number of outgoing calls.

The third and the following data lines 10 represent further data such as outgoing mails, calls etc.

The present figures of course merely contain examples of data forming the data sets 20. The present invention may be used for any kind of data such as for example for results of sport events, any kind of company data such as personnel or economic data etc. There is no restriction as to the kind of data and to the kind of representation of these data which may be shown in those data lines 10.

The system according to the embodiment shown in the figures may have additional tools which allow a comfortable use of the data lines 10.

On of these tools is a means for stopping the movement of a data line 10 which eases inspecting the data set 20. This stopping means may be triggered by moving a pointer to the data set 20 or data line 10 of interest or by touching on a touch screen the respective position on the screen.

Another tool is designed to show more details of a data set 20 to the user. This tool may be adapted to represent additional figures referring to a data line 10 or data set 20 or data such as relative or absolute values, changes or deviations of the data line 10 or further information referring to a company to which the data set 20 belongs etc. The tool may be adapted to create a space in a data set 20 in which the additional data are shown. Such space may be created for example on one or both sides of a column of a sparkline or beside the text of a data set.

In a further embodiment of the invention tools are provided for adjusting the size, color or form of the representation of the data. It is for example conceivable to provide selecting means for allowing the user to select the kind of sparkline which is represented in a data set 20.

The data lines 10 may be shown in a frame or window ("ticker portal") opening on the screen which is shown in FIG. 2.

The window may be located on the screen at a fixed location, such as on top of the screen or may be moved on the screen according to the users need. This allows the user to continue his current work on the screen and at the same time gives to the user without user interaction permanently the desired information in form of said data lines 10. Preferably the size of the window may be adjusted according to the users need for example so that it perfectly fits on the screen. Such size adjustment may be accompanied by a corresponding scale up or scale down of the data lines 10 so as to maintain the amount of displayed information independently of the size of the window.

The invention claimed is:

1. A system for providing information to a user comprising:
 a screen for showing the information to the user, wherein the screen is the screen of a portable device or a personal computer,
 receiving means for receiving one or more values from a source of values on which values the information shown to the user is based,
 generating means for generating two or more data lines wherein each of said data lines comprise at least one data set, wherein the data sets comprise data which are based on said values and wherein the data sets are assigned to the at least two or more data lines by predetermined or changeable criteria, wherein at least a first data set out of the data sets forming the data lines comprises a sparkline formed out of a plurality of graphical elements representing data of the first data set, wherein the plurality of graphical elements of the sparkline form a series of columns or bars or a line diagram representing values of the first data set,
 displaying means for simultaneously showing said two or more data lines to the user on said screen, and
 detail displaying means effective to display additional details referring to data represented by the graphical elements of said sparkline, wherein the detail displaying means is effective to dynamically enlarge the distance between at least two of a plurality of graphical elements of said sparkline in order to place the additional details into the generated space upon activation by the user.

2. The system according to claim 1 wherein the detail displaying means is triggered by a user selection of at least one graphical element from among said plurality of graphical elements of the first data set.

3. The system according to claim 1, wherein said additional details refer to details pertaining to said at least one graphical element from among said plurality of graphical.

4. The system according to claim 1, wherein the selection of a graphical element is triggered by a user by moving a pointer over said selected graphical element on said screen.

5. The system according to claim 1, wherein the system comprises uploading means for uploading said data to an internet or intranet web server and integrating means for integrating said data within an internet or intranet web page.

6. The system according to claim 1, wherein the system is adapted to provide the information to the user without requiring access to the intranet or internet.

7. The system according to claim 1, wherein the system comprises moving means for moving at least one of said data lines on the screen.

8. The system according to claim 7, wherein at least one data line comprises a label designating the kind of data which the data line is comprised and the labels of the data lines are not moved.

9. The system according to claim 1, wherein the system comprises moving means for moving only those data lines which are not fitting onto the screen whereas data lines which are fitting onto the screen are not moved.

10. The system according to claim 1, wherein the system comprises a database in which said values are stored wherein the database is connected or connectable to said receiving means for receiving the values from the database.

11. The system according to claim 1, wherein the system comprises connection means for connecting the receiving means to an external datasource, database or webservice in which said values are stored.

12. The system according to claim 10, wherein the databases comprise text files and/or data files.

13. The system according to claim 1, wherein the system comprises update means which are adapted to trigger an update of the data on a regular basis, on demand by the user or automatically, e.g. if any of said values changes.

14. The system according to claim 1, wherein the generating means are adapted to generate the data as text or as graphic representation, such as a vector-based graphic or as a bitmap.

15. The system according to claim 5, wherein said uploading means are adapted to perform said upload of the data to the internet web server by FTP, by file copy or by HTTP or SMTP.

16. The system according to claim 5, wherein the web page is a XML, HTML web page, a XHTML web page or a web page including a flash or java application.

17. The system according to claim 1, wherein the detail displaying means are adapted to provide size adjustments for depicting more details such as additional labels as well as relative and absolute values or value changes.

18. The system according to claim 1, wherein the system comprises adjusting means for adjusting the movement, such as direction and/or speed of movement of the data lines on the screen.

19. The system according to claim 1, wherein said detail displaying means is triggered by moving on the screen a pointer to said data or by touching on a touch screen the location on which the data are displayed on the screen.

20. The system according to claim 1, wherein the screen is a touch screen.

21. The system according to claim 1, wherein the screen is the screen of a portable device or of a personal computer.

22. The system according to claim 1, wherein the system comprises stopping means for stopping the movement of a data line which eases inspection of a data set included in said data line.

23. The system according to claim 1, wherein the system comprises means for showing additional details of a data set such as relative or absolute values, changes or deviations of a data line.

24. A system for providing information to a user comprising:
a screen for showing the information to a user,
receiving means for receiving one or more values from a source of values on which values the information shown to the user is based,
generating means for generating at least one data set, wherein the data set comprises data which are based on said values and wherein the data set comprises a sparkline formed out of a plurality of graphical elements representing data of the data set, wherein the plurality of graphical elements of the sparkline form a series of columns or bars or a line diagram representing values of the first data set,
displaying means for simultaneously showing said data set to the user on said screen, and
detail displaying means effective to display additional details referring to data represented by the sparkline, wherein the detail displaying means is effective to dynamically enlarge the distance between at least two out of the plurality of graphical elements of said sparkline in order to place the additional details into the generated space upon activation by the user.

25. A system according to claim 24, wherein the detail displaying means are effective to create space on one or both sides of said bars or columns of the sparkline selected by the user.

26. A system according to claim 24, wherein the sparkline shows the development of a parameter over time.

27. A system according to claim 24, wherein said additional details include additional labels, relative or absolute values or value changes referring to the displayed sparkline.

28. A system according to claim 24, wherein said additional details include absolute values or relative values showing the relation of the selected graphical element to the previous or succeeding graphical element.

* * * * *